(12) United States Patent
Haase

(10) Patent No.: US 6,848,397 B2
(45) Date of Patent: Feb. 1, 2005

(54) COOLING SYSTEM, IN PARTICULAR FOR A MOTOR VEHICLE ENGINE HAVING INDIRECT CHARGE AIR COOLING

(76) Inventor: Reiko Haase, Schwaikheim (DE)

(*) Notice: Subject to any disclaimer, the term of this patent is extended or adjusted under 35 U.S.C. 154(b) by 0 days.

(21) Appl. No.: 10/407,850

(22) Filed: Apr. 4, 2003

(65) Prior Publication Data

US 2003/0221638 A1 Dec. 4, 2003

(30) Foreign Application Priority Data

Apr. 6, 2002 (DE) .......................... 102 15 262
Oct. 8, 2002 (DE) .......................... 102 46 807

(51) Int. Cl.$^7$ .............................. F01P 9/00; F01P 7/02
(52) U.S. Cl. ................................. 123/41.01; 123/41.05
(58) Field of Search ...................... 123/41.01, 41.05, 123/41.1, 41.44, 41.47, 198 C

(56) References Cited

U.S. PATENT DOCUMENTS 4,362,131 A * 12/1982 Mason et al. .............. 123/41.1
5,390,632 A * 2/1995 Ikebe et al. ............... 123/41.02
5,477,816 A * 12/1995 Ranzinger et al. ......... 123/41.1

FOREIGN PATENT DOCUMENTS

GB          2038939 A  *  7/1980    ........... F02B/29/04

* cited by examiner

*Primary Examiner*—Tony M. Argenbright
*Assistant Examiner*—Hyder Ali

(57) ABSTRACT

In a cooling system for a motor vehicle engine having indirect charge air cooling, including a general cooling circuit for cooling a power-generating unit which comprises a coolant pump and a main coolant cooler, and an additional cooling circuit which branches off at an output point from the general cooling circuit and returns to the latter at an in-coupling point between the main coolant cooler and the coolant pump and contains an additional coolant cooler, means are provided for sensing the coolant temperature in an area where the coolant of the general cooling circuit and of the additional cooling circuit are mixed and also means for controlling the coolant flow as a function of the sensed coolant temperature.

14 Claims, 2 Drawing Sheets

COOLING SYSTEM, IN PARTICULAR FOR A MOTOR VEHICLE ENGINE HAVING INDIRECT CHARGE AIR COOLING

BACKGROUND OF THE INVENTION

The invention relates to a cooling system with indirect charge air cooling. Cooling systems of this type are used, for example, for motor vehicle engines having turbochargers, in order to use the general cooling circuit to cool the engine and the additional cooling circuit to indirectly cool the charge air which is supplied to the engine by the turbocharger. The invention also relates to a cooling system for a motor vehicle with direct charge air cooling. Cooling systems of this type are used, for example for motor vehicle engines with turbochargers, in order to use the general cooling circuit for the cooling of the engine and the additional cooling circuit for indirectly cooling the charge air which is supplied to the engine by the turbocharger.

The use of a cooling system for cooling the engine and for indirect charge air cooling in a motor vehicle is described in a paper entitled "Coolant-cooled charge air cooler for motor vehicle engines", published in the journal MTZ Motortechnische Zeitschrift 61(2000)9, pages 592 to 599. In the system described therein, the means for regulating the coolant flow through the main coolant cooler and the means for sensing the coolant temperature are integral parts of a thermostat element, which is arranged upstream of the main coolant cooler at a branching point of a bypass line bypassing the main coolant cooler. The additional cooling circuit including the additional coolant cooler, which is referred to in this application as the low-temperature coolant cooler, branches off between the engine and the thermostat from the general cooling circuit, with a regulating valve being arranged upstream of the low-temperature coolant cooler. After passing through the low-temperature coolant cooler, the coolant flows via the general cooling circuit to a charge air cooler and is then returned again to the general cooling circuit at an input point situated between the main coolant cooler and a coolant circulating pump. The bypass line bypassing the main coolant cooler also joins in at this input point.

It is the object of the present invention to provide a cooling system of the type mentioned initially which can be realized with comparatively little outlay and which facilitates reliable control of the coolant flow.

It is particularly the object of the present invention to provide a cooling system, which, with comparatively little outlay, facilitates the temperature of the coolant conducted through the additional coolant circuit to be taken into consideration in the control of the coolant flow and which provides for a sufficient pressure differential for the additional cooling circuit but the pressure load on the additional coolant cooler remains relatively low.

SUMMARY OF THE INVENTION

In a cooling system for a motor vehicle engine having indirect charge air cooling, including a general cooling circuit for cooling a power-generating unit which comprises a coolant pump and a main coolant cooler, and an additional cooling circuit which branches off at an output point from the general cooling circuit and returns to the latter at an in-coupling point between the main coolant cooler and the coolant pump and contains an additional coolant cooler, means are provided for sensing the coolant temperature in an area where the coolant of the general cooling circuit and of the additional cooling circuit are mixed and also means for controlling the coolant flow as a function of the sensed coolant temperature.

With this cooling system, the means for sensing the coolant temperature are arranged in the region of the input point of the coolant which is conducted via the additional cooling circuit into the general cooling circuit between this input point and the coolant circulation feed pump. As a result, the sensed coolant temperature also reflects the temperature of the coolant coming from the additional cooling circuit. The sensed coolant temperature affects the control of the coolant flow through the main coolant cooler and therefore also at least indirectly the control of the coolant component which is conducted through the additional cooling circuit. With the invention consequently the whole coolant flow can be controlled and especially also that part of it which flows through the additional cooling circuit as a function, inter alia, of the coolant temperature at the outlet end of the additional cooling circuit with relatively little outlay.

The invention furthermore provides a cooling system wherein the coolant circulating pump can be controlled in respect of its volume flow, the pumping rate and/or the pumping pressure. A coolant circulating pump of this type can take over the tasks of an externally controlled restrictor in the additional cooling circuit. The coolant circulating pump can be used, firstly, when the means for controlling the coolant flow across the main coolant cooler are adjusted to change the coolant flow in the additional cooling circuit and, secondly, to control the volume flow in the additional cooling circuit as a function of operating parameters of the motor vehicle engine.

A cooling system may contain a thermostat element, which is a component that automatically regulates the flow rate as a function of the temperature, i.e. the means for sensing the coolant temperature and the means for regulating the coolant flow are combined in it. The thermostat element may determine the coolant flow through the general cooling circuit and the additional cooling circuit as a function also of the output-side coolant temperature of the additional cooling circuit.

In an alternative embodiment of the invention, the means for controlling the coolant flow include an externally activatable flow-rate control element, which is activated by an associated control unit as a function of the sensed coolant temperature. A temperature sensor, which is arranged separately from the control element, is used for sensing the coolant temperature. In a further embodiment, the control element is arranged upstream of the main coolant cooler at a branching point of a bypass line which extends parallel to the main coolant cooler.

In another embodiment of the invention, the additional cooling circuit branches off between the coolant circulating pump and the engine. This has the advantage that the drop in pressure at the engine does not affect the pressure differential available for the additional cooling circuit. Since, on the other hand, the input point of the additional cooling circuit into the general cooling circuit is situated on the outlet end of the main coolant cooler, the additional coolant cooler needs to be designed only for a pressure load similar to that of the main coolant cooler.

In still another embodiment of the invention, an adjustable restriction element is provided in the additional cooling circuit between the output point and the additional coolant cooler. This restriction element permits a variable control of the volume flow of coolant in the additional cooling circuit.

The means for sensing the coolant temperature and means for controlling the coolant flow may be integral parts of a thermostat element, which is arranged at the input point of the additional cooling circuit into the general cooling circuit. As a result, the coolant flow through the general cooling circuit and the additional cooling circuit can be controlled as a function also of the outlet-side coolant temperature of the additional cooling circuit.

The adjustable coolant pump may also be used as a means for controlling the coolant flow and to compensate for changes in the volume flow as caused by an actuation of the thermostat element. This provides for a flexible control of the coolant flow in the general cooling circuit and/or in the additional cooling circuit.

The coolant pump may be adjustable as a function of a characteristic of the motor vehicle engine, in particular as a function of engine speed and/or engine torque. This enables the volume flow in the general cooling circuit and/or in the additional cooling circuit to be adapted to changed requirements on the part of the motor vehicle engine.

Furthermore, the coolant pump may be adjusted as a function of a characteristic of the coolant circuit, in particular as a function of the optimum volume flow for the charge air cooling. Characteristics of the general cooling circuit and/or of the additional cooling circuit, which characteristics are, if appropriate, stored beforehand in a controller and depend on engine operating parameters, can be used here for adjusting the coolant pump.

Preferably, the general cooling circuit includes a coolant expansion tank, which is coupled to the general cooling circuit via at least one bleed line. A plurality of bleed lines are preferably arranged at various points in the general cooling circuit, and at least one of them includes a restriction and at least one has no restriction. This permits pressure and/or volume equalization to be carried out in the general cooling circuit in a simple manner. Bleed lines are preferably arranged on the main coolant cooler, upstream of the coolant circulating pump, on a charge air cooler and/or on the motor vehicle engine. A bleed line may also be arranged on the additional coolant cooler.

Advantageous embodiments of the invention will be described below on the basis of the accompanying drawings:

DESCRIPTION OF PREFERRED EMBODIMENTS

Figure 1:
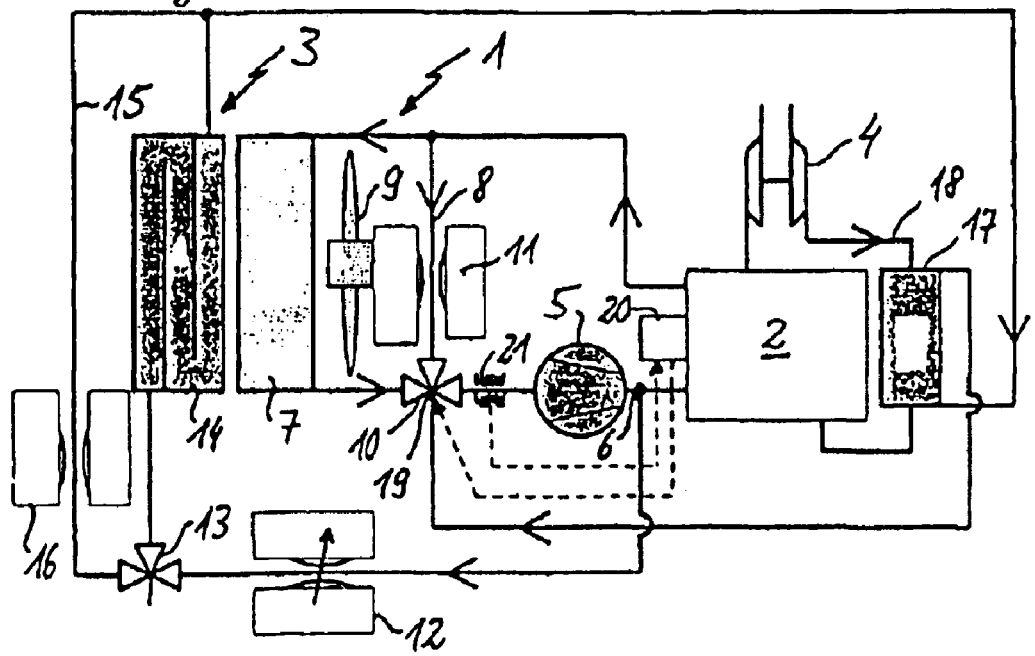
FIG. 1 shows a block diagram of a cooling system for a motor vehicle engine having indirect charge air cooling with a thermostat element arranged on the outlet end of a main coolant cooler.

The cooling system shown in FIG. 1 comprises a general cooling circuit 1 for cooling a heat-generating unit, that is, a motor vehicle engine 2, which optionally contains a restrictor, and also comprises an additional low-temperature coolant circuit 3. The additional cooling circuit provides for indirect cooling of charge air, which is supplied to the engine 2 by an exhaust-gas turbocharger 4. A coolant circulating pump 5 is used for circulating the coolant, for example water, in the two circuits 1, 3.

The coolant passes from the coolant circulating pump 5 to an output point 6 at which the additional cooling circuit 3 branches off. In practice, the coolant for the additional cooling circuit 3 can be branched off, for example, directly from a housing of the pump 5 or from a cylinder block of the engine 2. Coolant not branched off is conducted through the engine 2 in the engine cooling circuit 1. The coolant emerging heated from the engine is conducted through a main coolant cooler 7 and/or via a bypass line 8 bypassing the latter. In the main coolant cooler 7, the coolant is cooled by the air flow from a cooling fan 9 and, if appropriate, by the head wind.

The coolant leaving the main coolant cooler 7 reaches a thermostat 10 to which also the bypass line 8 extends. From the thermostat 10, the coolant then is conducted again to the circulating pump 5. The bypass line 8 is used in a customary manner in order, depending on the situation, for example in particular with the engine 2 still cold, to prevent the coolant from being excessively cooled in the main coolant cooler 7. For adaptation to the pressure loss, a restriction element 11 is optionally placed in the bypass line 8.

For establishing the required coolant flow, coolant branched off into the additional cooling circuit 3 at the output point 6 is initially conducted via a restriction element 12, which can be adjusted in an externally controlled manner. From there the coolant flows to an electrically controllable 3/2-way directional control valve 13. By means of this valve 13, the coolant is directed in controllable amounts through a low-temperature coolant cooler or additional coolant cooler 14 and/or via a bypass line 15, which bypasses the cooler 14 and in which a restriction element 16 may be arranged for the purpose of adapting the pressure loss in the bypass line 15 to that in the additional coolant cooler 14. The coolant of the additional cooling circuit 3 then reaches a charge air cooler 17 through which charge air, which is supplied by the exhaust-gas turbocharger 4 via a charge air line 18, is conducted before being fed to the engine 2.

The coolant leaving the charge air cooler 17 is then returned to the thermostat 10, more precisely, to a control space thereof. In this way, the coolant-flow regulating behavior of the thermostat 10 is determined not only by the temperature of the coolant in the engine cooling circuit 1, i.e. of the coolant coming from the main coolant cooler 7 or the bypass line 8, but also by the temperature of the coolant coming from the charge air cooler 17 of the additional cooling circuit 3. In this case, the thermostat 10 is employed as a flow-rate control element controlled automatically as a function of temperature.

The thermostat 10 is therefore situated at an input point 19 at which the additional cooling circuit 3 again reaches the engine cooling circuit 1. As an alternative, instead of the thermostat 10, an externally controlled flow-rate control element, for example an electrically heated thermostat, a spool slide valve, etc., can be arranged at the input point 19. The control element is then operated by an associated control unit as a function of a sensed coolant temperature, the coolant temperature in turn being sensed at a point at which it is influenced not only by the coolant emerging from the main coolant cooler 7, but also by the coolant from the additional cooling circuit 3. One possible way of realizing this, as indicated by dashed lines in FIG. 1, is to use an engine controller 20, which is present in any case, as the activating control unit and to sense the coolant temperature by means of a temperature sensor 21 which is arranged between the input point 19 and the coolant pump 5.

The adjustable restriction element 12 can be designed, for example, as a mechanically or electrically externally controlled restriction means. It can be used, firstly, to compensate for the change in volume flow in the additional cooling circuit 3 when the thermostat 10 or the alternative, externally controlled, flow-rate control element is opened and, secondly, to adapt the volume flow in the additional cooling circuit 3 to an optimum value for the charge air cooling as a function of the speed and torque of the engine 2, with further parameters, for example the coolant temperature at the outlet side of the charge air cooler 17, being taken into account. Depending on the application, a fixed restriction means upstream of the additional coolant cooler 14 or the 3/2-way directional control valve 13 may be used instead of the adjustable restriction element.

The cooling system as described can be realized with relatively little outlay and provides a number of functional advantages. In particular, the coolant from the additional cooling circuit 3 is taken into account in the control of the coolant temperature. In addition, the branching off of the coolant at the outlet side of the pump 5 before it reaches the engine 2 and its in-coupling at the suction side of the pump 5 guarantee that the pressure differential is sufficient, and the coolant temperature in the additional cooling circuit 3 is as low as possible and, in particular, it is not subjected to heating in the engine 2.

In the low-temperature additional cooler 14, the coolant is cooled by the head wind to the lowest possible temperature, with the result that it can bring about a very effective charge air cooling in the charge air cooler 17. Furthermore, the input of coolant from the additional cooling circuit 3 at the outlet side of the main coolant cooler 7 into the control space of the thermostat 10 has, in comparison with an alternatively conceivable input at the inlet side of the main coolant cooler 7, the advantage that the coolant pressure in the additional cooling circuit 3 can be kept lower by an amount corresponding to the pressure loss in the main coolant cooler 7 and at the thermostat 10 or the externally controlled flow-rate control element which can alternatively be used for reducing the pressure load in the low-temperature coolant cooler 14.

Otherwise, this cooling system achieves all of the known advantages of indirect charge air cooling, such as omission of a complex charge air cooler, possibility of structurally integrating the low-temperature coolant cooler 14 into the main coolant cooler 7, etc.

Figure 2:
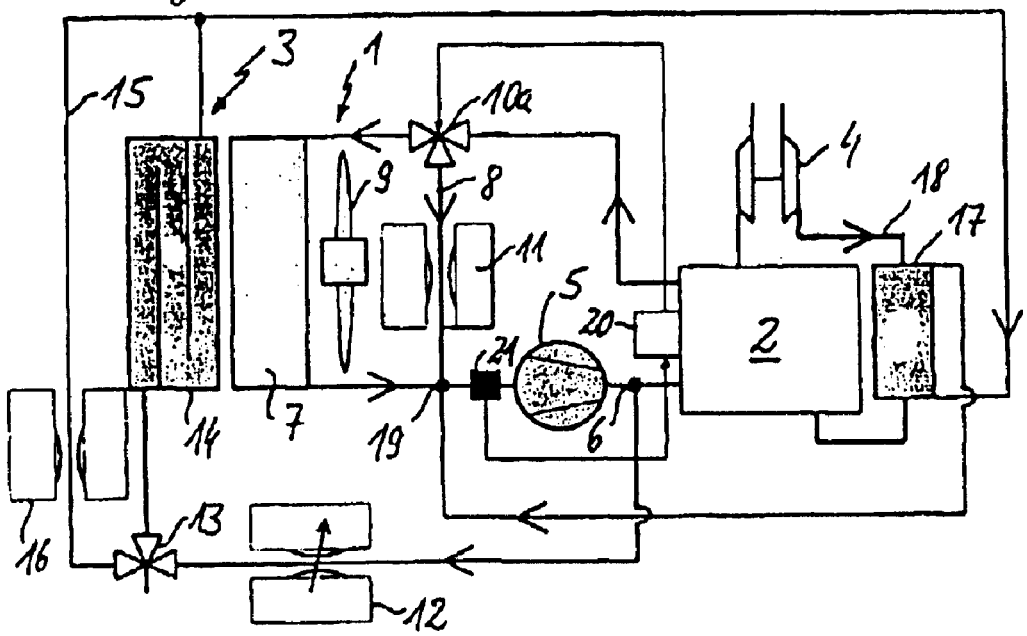
FIG. 2 shows a block diagram of a cooling system for a motor vehicle engine having indirect charge air cooling with an externally controlled flow-rate control element arranged at the inlet and of a main coolant cooler.

FIG. 2 shows a variant of the cooling system of FIG. 1, in which, for the sake of clarity, the same reference numbers are used for functionally identical components and reference can be made in this respect to the above description of FIG. 1. The system of FIG. 2 differs from that of FIG. 1 by the fact that the means for controlling the coolant flow are not arranged at the input point 19 of the additional cooling circuit 3 into the engine cooling circuit 1, but rather at the inlet side of the main coolant cooler 7, especially at the branching off of the bypass line 8, which extends parallel to the latter. Arranged at this point, in the example of FIG. 2, is an externally controlled flow-rate control element 10*a* of the type mentioned above for FIG. 1, which is used as an alternative to the thermostat 10, for example in the form of a rotary slide or a spool valve. The control element 10*a* is activated by an associated control unit as a function of the sensed coolant temperature. This is realized, in the exemplary embodiment of FIG. 2, in a similar manner to that of the alternative arrangement indicated by dashed lines in FIG. 1 using the engine controller 20 as the control unit. The control unit is supplied with the output signal of the temperature sensor 21 which is optionally present in FIG. 1 and is situated behind the input point 19 upstream of the feed pump 5 in the direction of flow of the coolant.

The properties and advantages mentioned above with respect to the exemplary embodiment of FIG. 1 are correspondingly available with the system variant of FIG. 2. In particular, it is ensured that also the temperature of the coolant coming from the low-temperature coolant circuit 3 is taken into consideration in the control of the coolant flow controlled by the coolant temperature, since the temperature sensor 21 is arranged downstream of the input point 19 in the direction of the coolant flow. Also, the engine controller 20 or alternatively another control unit activates the flow-rate control element 10*a* as a function, inter alia, of the coolant temperature sensed by the temperature sensor 21. Since the output point 6 and the input point 19 are unchanged, these pressure ratios also apply for the engine cooling circuit 1 and the additional cooling circuit 3 in both exemplary embodiments shown.

The exemplary embodiments which have been shown and explained above make it clear that the cooling system according to the invention is suitable for example for cooling vehicle engines having parallel, indirect charge air cooling. Other uses are possible, for example where a heat-generating unit is to be cooled by the general cooling circuit and, at the same time, an additional medium is to be cooled by the additional cooling circuit. A common feature of all the realizations is the fact that the means for sensing the coolant temperature are arranged in the region of the in-coupling point of the additional cooling circuit into the general cooling circuit or downstream of the latter and upstream of the coolant circulating pump, with the result that also the temperature of the coolant coming from the additional cooling circuit is taken into consideration. The temperature of the coolant coming from the additional cooling circuit is therefore also always taken into consideration for the regulation of the coolant flow through the main coolant cooler and therefore also of the coolant flowing parallel to the main coolant cooler via the additional cooling circuit, the said regulation taking place as a function of the sensed coolant temperature.

Figure 3:
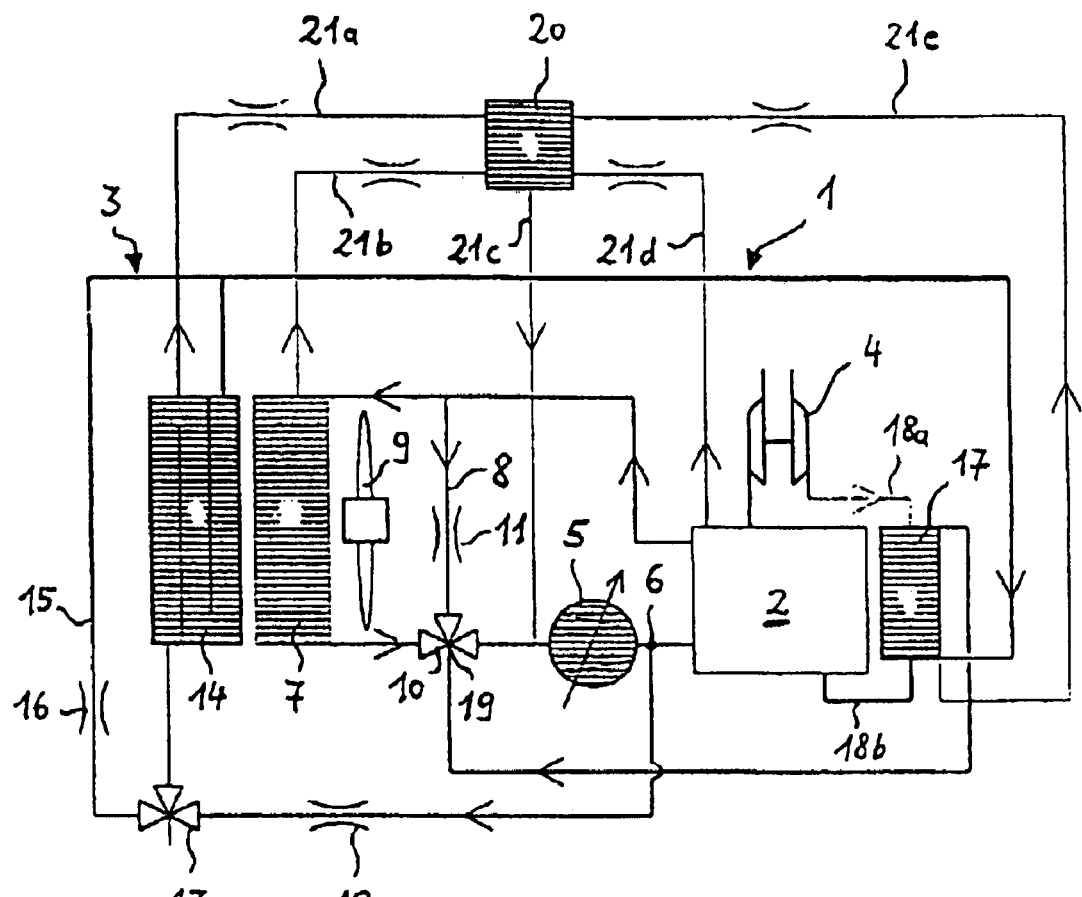
FIG. 3 shows a block diagram of a cooling system for a motor vehicle engine having indirect charge air cooling with a thermostat element arranged at the outlet end of a main coolant cooler and a coolant circulating pump with controllable pumping volume.

The cooling system shown in FIG. 3 comprises an engine cooling circuit 1 as the general cooling circuit for cooling a heat-generating unit, that is, a motor vehicle engine 2, which optionally contains a restriction means, and also comprises a low-temperature coolant circuit 3 as an additional cooling circuit for the indirect cooling of charge air, which is supplied to the engine 2 by the exhaust-gas turbocharger 4. A coolant circulating pump 5 which can be adjusted in respect of its volume flow is used for circulating the coolant, for example water, in the two circuits 1 and 3. In a modified exemplary embodiment, the coolant circulating pump is designed in a manner such that the coolant can be adjusted in respect of its supply pressure.

The coolant passes from the coolant circulating pump 5 to an output point 6 at which the additional cooling circuit 3 branches off. In practice, the coolant for the additional cooling circuit 3 can be branched off, for example, directly from a housing of the feed pump 5 or from a cylinder block of the engine 2. Coolant, which is not branched off at this point, is conducted through the engine 2. The coolant emerging heated from the engine is conducted through a main coolant cooler 7 and/or via a bypass line 8 bypassing the cooler 7. In the main coolant cooler 7, the coolant is cooled by the airflow from a cooling fan 9 and, if appropriate, by the head wind of the vehicle.

The coolant leaving the main coolant cooler 7 flows to a thermostat 10 to which the bypass line 8 also extends. The coolant then flows from the thermostat 10 again to the circulating pump 5. The bypass line 8 is used in a conventional manner, for example, in particular if the engine 2 is still cold, for preventing cooling of the coolant in the main coolant cooler 7. For adaptation to the loss in pressure of the coolant in the cooler 7, a restriction element 11 is optionally placed into the bypass line 8.

Coolant branched off into the additional cooling circuit 3 at the output point 6 is initially conducted, for the purpose of obtaining the required coolant flow, via a restriction element 12 to an electrically operable 3/2-way directional control valve 13. By means of this valve 13, the coolant is directed in controllable amounts through a low-temperature or additional coolant cooler 14 and/or via a bypass line 15 which bypasses the latter and in which a restriction element 16 may be placed for generating a pressure loss in the bypass line 15 to the additional coolant cooler 14. The coolant of the additional cooling circuit 3 then flows to a charge air cooler 17, through which charge air from the exhaust-gas turbocharger 4 is conducted before it is supplied to the engine 2 via a charge air line 18a, 18b.

The coolant leaving the charge air cooler 17 is then returned to the thermostat 10, more precisely to a control space thereof. As a result, the coolant-flow control behavior of the thermostat 10 is determined not only by the temperature of the coolant in the engine cooling circuit 1, i.e. of the coolant coming from the main coolant cooler 7 or the bypass line 8, but also by the temperature of the coolant coming from the charge air/coolant cooler 17 of the additional cooling circuit 3. In this case, the thermostat 10 is conventionally a flow-rate control element by which the coolant flow is automatically controlled in a temperature-dependent manner.

The thermostat 10 is therefore located at an in-coupling point 19 at which the additional cooling circuit 3 joins again the engine cooling circuit 1. As an alternative, instead of the thermostat 10, an externally controlled flow-rate setting element, for example an electrically heated thermostat, a rotary slide valve, etc., can be arranged at the input point 19. The control element is then activated by an associated control unit as a function of a sensed coolant temperature, the coolant temperature in turn being sensed at a point at which it is influenced not only by the coolant emerging from the main coolant cooler 7, but also by the coolant from the additional cooling circuit 3.

In the low-temperature coolant cooler 14, the coolant is cooled to the lowest possible temperature by the head wind, with the result that it can provide for very effective charge air cooling in the charge air cooler 17.

The adjustable coolant circulating pump can be used, firstly, to compensate for the change in volume flow in the additional cooling circuit 3 when the thermostat 10 or the alternative, externally controlled, flow-rate control element is opened and, secondly, to adapt the volume flow in the additional cooling circuit 3 to an optimum value for the charge air cooling as a function of the speed and torque of the engine 2, taking further parameters, for example the coolant temperature at the outlet side of the charge air cooler 17, into consideration. A coolant circulating pump of this type can take over the tasks of an externally controlled restrictor in the additional cooling circuit 3. With a coolant circulating pump of this type, it is possible, firstly, to change the coolant flow in the additional cooling circuit when the means for regulating the coolant flow across the main coolant cooler are adjusted, and, secondly, to adjust the volume flow in the additional cooling circuit as a function of engine parameters of the motor vehicle engine. It provides for a particularly flexible control of the coolant flow in the general cooling circuit and/or in the additional cooling circuit. Characteristics of the general cooling circuit and/or of the additional cooling circuit, are, if appropriate, stored in advance in a controller and are dependent on engine operating parameters. They can be used as desired values when adjusting the coolant pump.

The general cooling circuit has a coolant expansion tank 20, which is coupled to the general cooling circuit 1 and the additional cooling circuit 3 via five partially restricted bleed lines 21a–21e. This enables a pressure and/or volume equalization to be carried out in the general cooling circuit and in the additional cooling circuit in a simple manner. The restricted bleed line 21a extends from the additional coolant cooler 14, the restricted bleed line 21b extends from the main coolant cooler, the unrestricted bleed line 21c extends to the coolant circulation pump, the restricted bleed line 21d extends from the engine 2, and the restricted bleed line 21e extends from the charge air cooler 17. Corresponding to their distance from the pump 5, the bleed lines 21a and 21e are configured in a manner such that they are severely restricted at at least one narrow point having a diameter of approximately 1 mm and the bleed lines 21b and 21d are configured in a manner such that they are slightly restricted at at least one narrow point having a diameter of approximately 3 mm. In a particular exemplary embodiment, the bleed line 21c is connected directly to the pump 5.

The cooling system can be realized with relatively little outlay and provides for a number of functional advantages. In particular, the coolant from the additional cooling circuit 3 is taken into consideration in the control of the coolant temperature. In addition, the branching off of the coolant at the outlet end of the circulating pump 5 before it flows through the engine 2 and the in-coupling of it at the intake side of the circulating pump 5 guarantee a sufficient pressure differential, and the coolant temperature in the additional cooling circuit 3 is as low as possible and, in particular, is not subjected to heating in the engine 2. Furthermore, an optimum volume flow in the circuits can be provided for by the adjustable feed pump 5 in interaction with the thermostat.

What is claimed is:

1. A cooling system, for a motor vehicle engine having indirect charge air cooling, comprising:
    a general cooling circuit (1) including a coolant for cooling a power- generating unit (2) which includes a coolant circulating pump (5) and a main coolant cooler (7),
    an additional cooling circuit (3) for cooling additional coolant, which branches off at an output point (6) downstream of the coolant circulating pump (5) but ahead of the engine (2) from the general cooling circuit and returns to the latter at an in-coupling point (19) between the main coolant cooler and the coolant circulating pump (5), and which includes an additional coolant cooler (14) and, upstream of the additional coolant cooler (14), a flow restrictor (12), said additional coolant cooler being arranged in the air stream in front of the main coolant cooler, and a charge air cooler (17) for cooling the charge air supplied to the engine (2), means (10, 21) for sensing the coolant temperature and means (10, 10a) for controlling the coolant flow through the main coolant cooler (7) as a function of the sensed coolant temperature, said means (10, 21) for sensing the coolant temperature being arranged in a region where the coolant of the general cooling circuit and the additional cooling circuit are mixed.

2. A cooling system according to claim 1, wherein the means for sensing the coolant temperature and the means for controlling the coolant flow are integral parts of a thermostat element (10) which is arranged at the in-coupling point (19).

3. A cooling system according to claim 1, wherein the means for controlling the coolant flow include an activatable flow-rate control element (10a) which is activated by an associated control unit (20) as a function of the sensed coolant temperature, and the means for sensing the coolant temperature comprise a temperature sensor (21) arranged separately from the flow-rate control element.

4. A cooling system according to claim 3, wherein a flow-rate control element (10a) is arranged at the in-coupling point (19).

5. A cooling system according to claim 3, wherein the flow-rate control element (10a) is arranged upstream of the main coolant cooler (7), in the direction of flow of the coolant, at a branching point of a bypass line (8) bypassing the main coolant cooler.

6. A cooling system according to claim 1, wherein the output point (6) is situated in the region between the coolant circulating pump (5) and the power-generating unit (2).

7. A cooling system according to claim 1, wherein the flow restrictor is an adjustable restriction element (12) which is arranged in the additional cooling circuit (3) between the output point (6) and the additional coolant cooler (14).

8. A cooling system according to claim 1, wherein the power-generating unit is a motor vehicle engine and the additional cooling circuit includes a cooler for cooling the charge air for the motor vehicle engine, which charge air is supplied by an associated exhaust-gas turbocharger (4).

9. A cooling system, for a motor vehicle engine having indirect charge air cooling, comprising a general cooling circuit (1) including a coolant for cooling the motor vehicle engine (2), which contains a coolant circulating pump (5) and a main coolant cooler (7), an additional cooling circuit (3) for cooling the charge air, which additional cooling circuit (3) branches off at an output point (6) downstream of the coolant circulating pump (5) but ahead of the engine (2) from the general cooling circuit and returns to the latter at an in-coupling point (19) between the main coolant cooler and the coolant pump (5), and which includes an additional coolant cooler (14) and, upstream of the additional coolant cooler (14), a flow restrictor (12), said additional coolant cooler being arranged in the air stream in front of the main coolant cooler, and a charge air cooler (17) for cooling the charge air supplied to the engine (2), and means (10) for controlling the coolant flow through the main coolant cooler (14) as a function of the coolant temperature, said coolant pump (5) being adjustable as to at least one of its pumping volume flow, its coolant circulating rate and its coolant pressure.

10. A cooling system according to claim 9, wherein a thermostat element (10) is arranged at the in-coupling point (19) and said thermostat element (10) includes means for sensing the coolant temperature and means for controlling the coolant flow as integral parts thereof.

11. A cooling system according to claim 9, wherein an adjustable coolant pump (5) is used for controlling the coolant flow and for compensating for a change in the volume flow caused by an actuation of the thermostat element (10).

12. A cooling system according to claim 9, wherein the coolant pump (5) is adjustable as a function of at least one of engine speed and engine torque.

13. A cooling system according to claim 9, wherein the coolant pump (5) is adjustable as a function of the optimum volume flow for the charge air cooling.

14. A cooling system according to claim 9, wherein the general cooling circuit is in communication with a coolant expansion tank via at least one bleed line.

* * * * *